United States Patent

[11] 3,625,803

| [72] | Inventors | Leonard J. Masulis<br>Perrysburg;<br>Richard A. Morrette, Holland, both of Ohio |
|---|---|---|
| [21] | Appl. No. | 861,864 |
| [22] | Filed | Sept. 29, 1969 |
| [45] | Patented | Dec. 7, 1971 |
| [73] | Assignee | Owens-Illinois, Inc. |

[54] MULTILAYER PAD LAMINATOR
4 Claims, 4 Drawing Figs.

[52] U.S. Cl. .................................................. 156/563,
156/364, 156/566, 156/570
[51] Int. Cl. .........................................B32b 31/04,
G05b 6/02
[50] Field of Search ........................................ 156/64,
363, 299, 300, 364, 302, 303, 559, 563, 566, 569,
570; 198/35; 214/8

[56] References Cited
UNITED STATES PATENTS

| 2,288,360 | 6/1942 | Jensen ........................... | 156/559 X |
| 2,816,755 | 12/1957 | Dusenbury et al. ............ | 156/563 X |
| 3,259,417 | 7/1966 | Chapman ....................... | 156/569 X |
| 3,414,257 | 12/1968 | Muller ........................... | 198/35 X |
| 3,522,129 | 7/1970 | Crathern ....................... | 156/566 X |

Primary Examiner—Benjamin A. Borchelt
Assistant Examiner—James M. Hanley
Attorneys—Alan J. Steger and E. J. Holler ABSTRACT: Apparatus designed to build up a multilayered pad by laminating a plurality of separate sheets or boards as the sheets are conveyed through the apparatus. A plurality of magazines are supported adjacent a conveyor and each is operable to feed individual die cut corrugated sheets one-at-a-time onto the conveyor. The conveyor includes an elongated support surface having a pair of laterally spaced, longitudinally extending slots formed therein, with the individual sheets being conveyed along the surface by one of a plurality of pairs of tapered pins which project upwardly through the spaced slots above the support surface. Each of the sheets to be laminated is formed with a pair of spaced openings for telescopingly receiving a pair of the conveyor pins to accurately position the sheet on the conveyor surface and to move the sheet along the support surface by means of a chain which moves the conveyor pins. These conveyor pins provide the means for aligning and registering the various sheets as they are laminated into a multilayer pad.

INVENTORS
LEONARD J. MASULIS
RICHARD A. MORRETTE
BY
E. J. Holler
ATTORNEYS

FIG. 3
FIG. 4
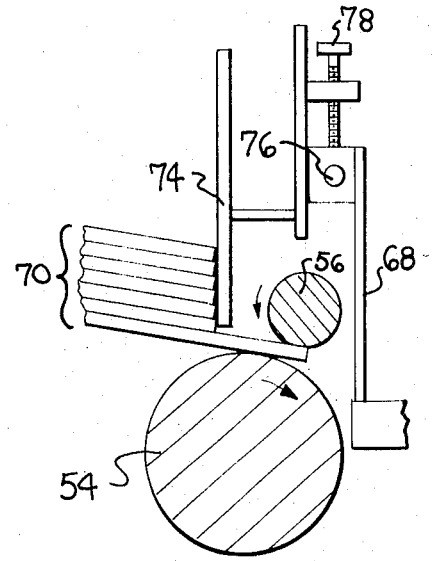
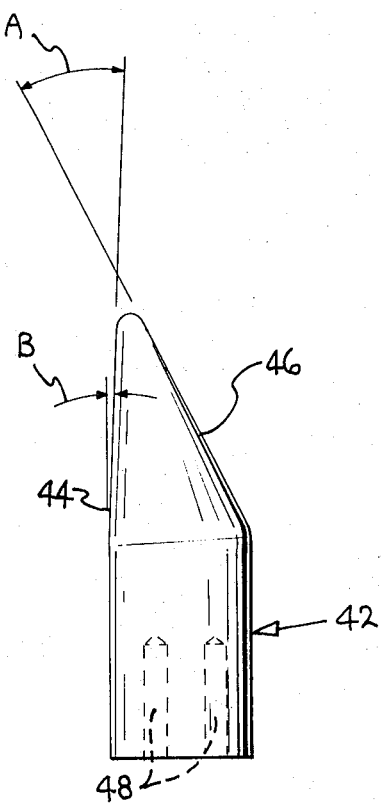

3,625,803

MULTILAYER PAD LAMINATOR

BACKGROUND OF THE INVENTION

This invention relates to unique registration apparatus and more particularly to registration apparatus employed in the laminating of a plurality of corrugated sheets to form a multilayered pad.

In the field of adhesively applying one sheet to another in face-to-face relation, it is, in many instances, a requirement that the sheets be prepositioned with respect to each other before they are brought into adhesive contact. Such sheet lamination is generally performed on a continuous basis by having an intermittently operated conveyor belt carry a series of adhesively faced sheets in spaced relation and passing them consecutively under stack-fed sheets which are dropped one by one into contact with the adhesively faced sheets.

In those instances where accurate alignment of the two sheets is important prior to their being brought together, various forms of registration apparatus have been developed. Such apparatus has in most instances been of the type which orients the entire conveyor belt or attempts to accurately control the positioning of one sheet on the conveyor so as to give reasonably close registration with respect to the second sheet subsequently brought into contact with the first sheet. Although such prior art devices have served their purpose they have not generally proven to be accurate enough to provide the precise registration necessary for laminating numerous sheets into multilayered pads.

Accordingly, it is an object of this invention to provide a laminating apparatus adapted to adhesively unite a plurality of sheets into a multilayered pad which incorporates a unique pin-type registration means which accurately positions and aligns the various sheets during their lamination.

SUMMARY OF THE INVENTION

In general, the apparatus of this invention is designed to build up a multilayered pad by laminating a plurality of separate sheets or boards as the sheets are conveyed through the apparatus. A plurality of magazines are supported adjacent a conveyor and each is operable to feed individual die cut corrugated sheets one at a time onto the conveyor. The conveyor, includes an elongated support surface having a pair of laterally spaced longitudinal extending slots forming therein with the individual sheets being conveyed along the surface by one of a plurality of pairs of tapered pins which project upwardly through the spaced slots above the support surface. The pins are moved along the support surface by suitable drive means, such as a chain, or the like, located beneath the support surface.

Each of the sheets to be laminated is formed with a pair of spaced openings for telescopingly receiving a pair of conveyor pins to accurately position the sheet on the conveyor surface. As a pair of pins moves into position at the first magazine they break a light beam to actuate a photoelectric sensor which, in turn, actuates the release mechanism of the magazine to drop a single sheet onto the support surface in position for the spaced openings to telescope onto the tapered pins. As the sheet progresses along the support surface it passes beneath a plurality of rollers to force the openings in the sheet firmly onto the tapered pins to accurately position the sheet. Thereafter, the sheet passes beneath a glue applicator where a suitable adhesive is sprayed onto its upper surface. At the next magazine, another photoelectric sensor actuates a release mechanism to drop a second sheet in superimposed relation on the first sheet. The superimposed sheets then pass beneath a set of rollers to press the top sheet onto the tapered pins to accurately position the second sheet in alignment with the first.

When the desired number of sheets are laminated in this manner the stacked assembly passes beneath a plurality of belts which apply sufficient pressure to press the assembly together and facilitate bonding. Photoelectric sensors are provided to stop the apparatus if a sheet is not fed into position at the last magazine to assure that a sheet having adhesive applied to its top surface does not pass directly beneath the pressure applying belts.

The individual magazines feed the sheets onto a pair of spaced horizontal bars extending transversely above the conveyor. When the photoelectric sensors indicate that the conveying pins are in the proper position, a fluid motor or cylinder is actuated to pivot one of the horizontal bars to permit the sheet to drop directly onto the pins. The bar is then returned to its normal position to receive the next sheet from the upper portion of the magazine in anticipation of the next pair of pins moving therebeneath.

The specific structural and operational details of the laminating apparatus of this invention will become more apparent upon reference to the following detailed description of the drawings illustrating a preferred embodiment of the invention.

IN THE DRAWINGS:

FIG. 3 is a sectional view of the sheet-feeding portion of the magazine assembly of FIG. 2.

FIG. 4 is a front elevation view of one of the plurality of conveyor pins utilized in the laminating apparatus of FIG. 1.

DETAILED DESCRIPTION OF THE DRAWINGS

Figure 1:
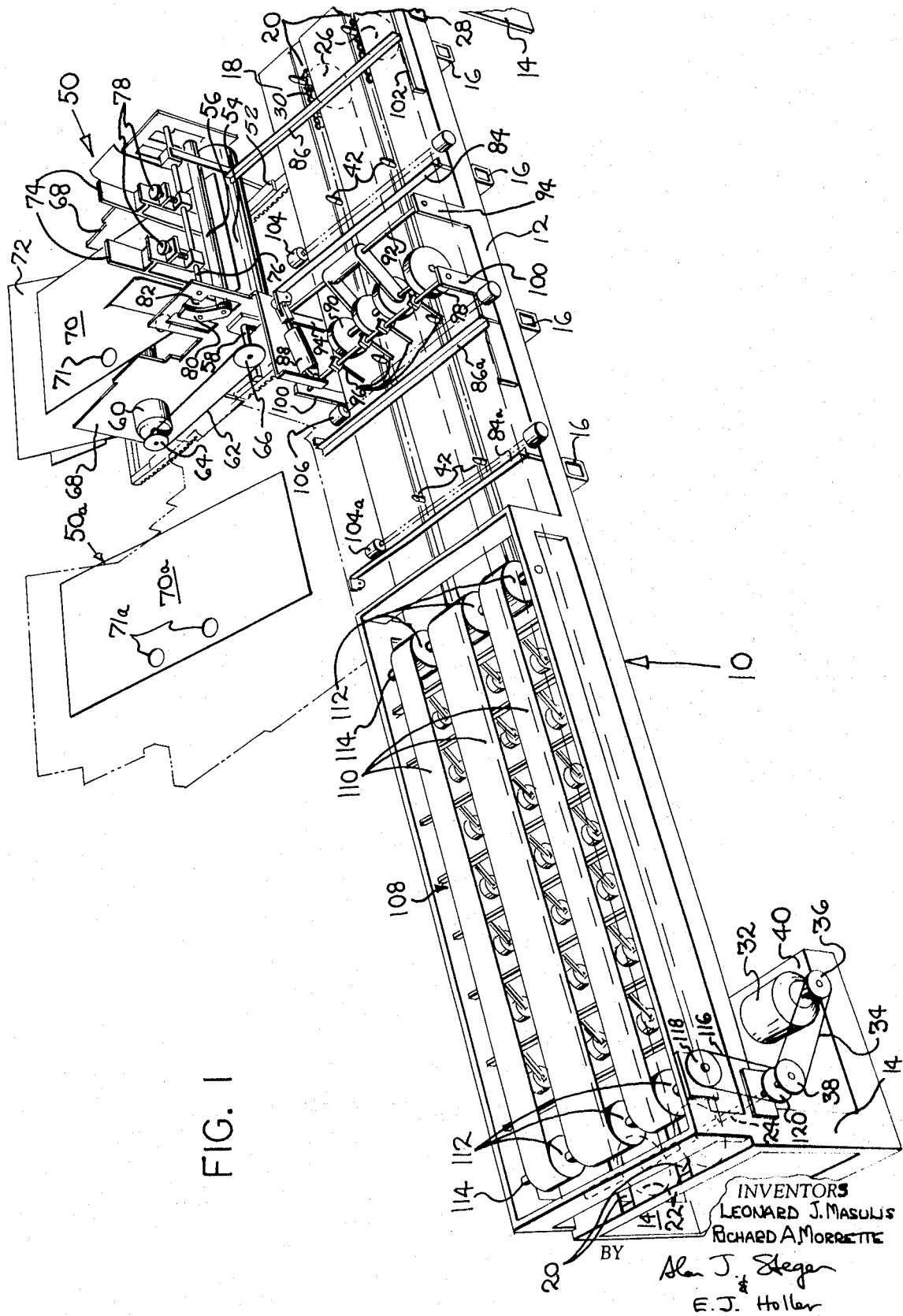
FIG. 1 is a perspective view of the laminating apparatus of this invention.

A laminating apparatus in accordance with this invention is indicated generally by the numeral 10 in FIG. 1. The laminating apparatus 10 includes a frame 12 supported by legs 14 and reinforced by crossbeams 16. The laminator frame 12 further includes an elongated support surface 18 which extends the full length of frame 12 and includes a pair of laterally spaced, longitudinal extending slots 20 formed therein. Positioned under the slots 20 are a pair of sprockets 22 mounted on shaft 24 which is rotatably mounted to the laminator frame 12. A similar pair of sprockets 26 are positioned beneath the slots 20 at the opposite end of the laminator frame 12 and are mounted on a shaft 28 which is rotatably attached to the frame 12. A pair of conveyor chains 30 are positioned within the slots 20 and mounted for rotation around the pairs of sprockets 22 and 26. The conveyor chains 30 are driven by means of motor 32 which is drivingly connected to the shaft 24 by means of a belt 34 and pulleys 36 and 38. The motor 32 is mounted on a platform 40 which is positioned under the support surface 18 of the laminator frame 12 and attached to the legs 14.

A plurality of pairs of tapered cylindrical pins 42 are attached to and move with the pair of chains 30 along the slots 20 in the support surface 18. The details of these pins 42 can best be seen by reference to FIG. 4. In FIG. 4 it can be seen that the front surface 44 of the pin 42 is virtually straight, being tapered only about 2° (angle B) from the vertical. In contrast to this, the rear surface 46 of the tapered pins 42 is tapered so as to be at an angle of approximately 30° (angle A) with the vertical. It can further be seen in FIG. 4 that fastener receiving openings 48 are provided in the bottom of the tapered pins 42 to receive the attaching means (not shown) to fasten the tapered pins to the conveyor chains 30 for movement along the slots 20.

Figure 2:
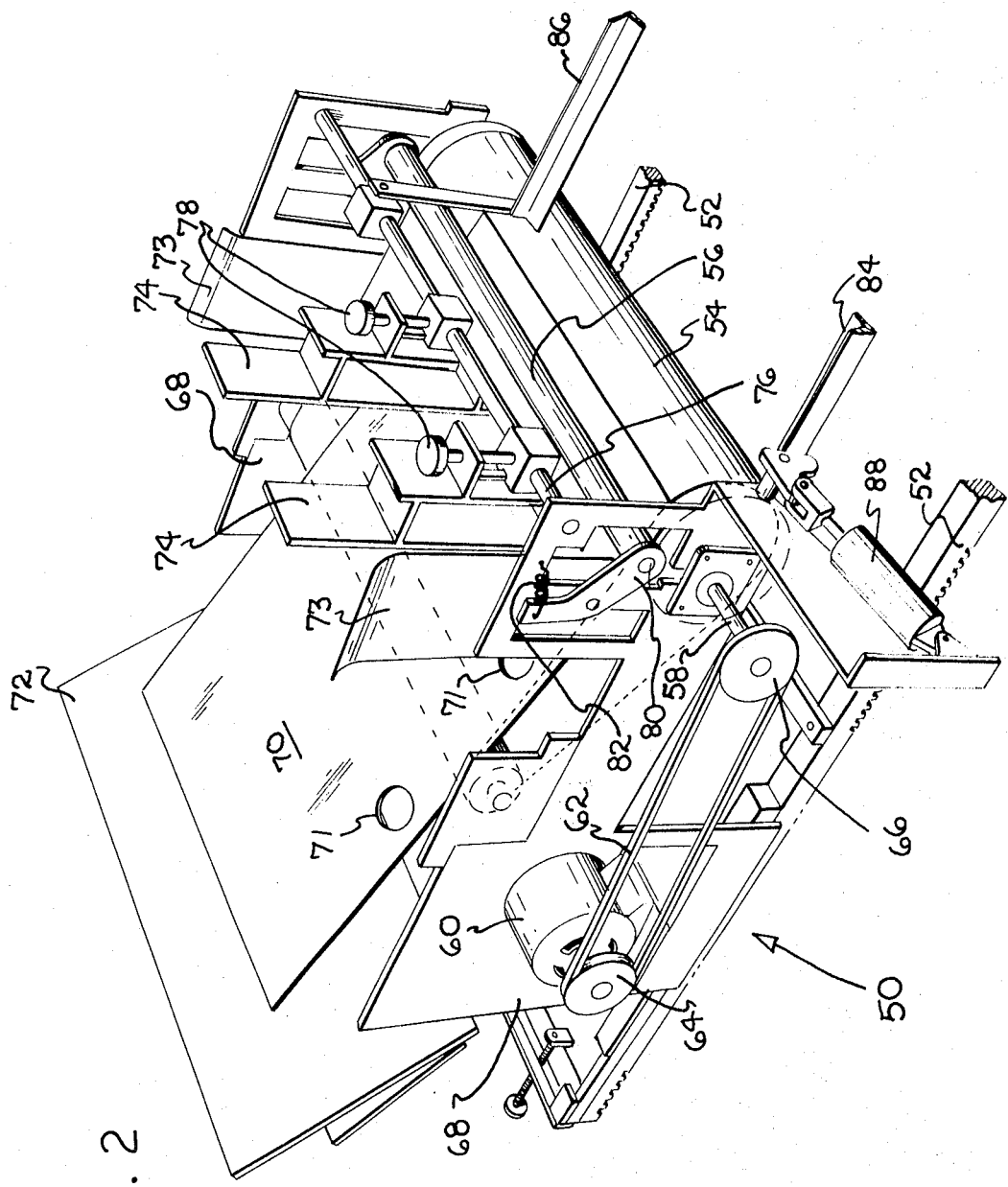
FIG. 2 is an enlarged perspective view of one of the magazine assemblies of the laminating apparatus of FIG. 1.

A magazine assembly indicated generally by the numeral 50 is provided to feed individual sheets of the material to be laminated onto the conveyor pins 42 and the support surface 18 of laminating apparatus 10. The details of the magazine 50 can best be understood by reference to FIGS. 2 and 3 where it can be seen that magazine 50 is mounted on a frame 52 which is attached to the laminator frame 12. The magazine 50 includes a large rotating feed roll 54 and a pressure nip roll 56. The feed roll 54 is mounted for rotation on a shaft 58 which is driven by motor 60 by means of belt 62 and pulley 64 and 66.

The shaft 58 on which feed roll 54 is mounted is held for rotation by means of a pair of side panels 68 which are rigidly connected to the magazine frame 52. The magazine 50 also includes means which define a hopper for containing a plurality of sheets 70 of the material to be laminated. It should be noted that each of the sheets 70 to be laminated is formed with a pair of spaced openings 71 for telescopingly receiving the conveyor pins 42 to accurately position the sheet on the surface 18. The elements defining the hopper include an inclined entrance panel 72, side-restraining panels 73, and sheet-separating panels 74. The sheet separators 74 restrain all but the bottom sheet and allow only tension bottom sheet to pass into contact with the feed roll 54 and the pressure roll 56. The sheet separators 74 are mounted by means of a bar 76 to the magazine side panel 68 and are adjustable by means of thumbscrews 78. Thus, as can be seen in FIG. 3, the position of the sheet separators 74 can be adjusted to compensate for varying thickness in the sheets 70 being fed from the magazine 50 onto the laminator 10. It should be noted that the pressure roll 56 is suspended on pressure roll arms 80 which are pivotally attached to side panels 68. The pressure roll 56 is biased toward roll 54 by means of tension spring 82.

The sheet 70, as it is fed between the rolls 54 and 56, is received on a pair of horizontal rails 84 and 86 which extend transversely above the support surface 18 of the laminator 10. The front horizontal rail 84 is retractable by means of a fluid motor or cylinder 88 which, when actuated, pivots the front rail 84 to allow a sheet 70 to drop onto the pins 42 passing along the support surface 18. Thus, when actuated, the motor 60 rotates the feed roll 54 to thereby feed a single sheet 70 onto the horizontal support rails 84 and 86. Similarly, when activated the cylinder 88 pivots the front rail 84 to thereby release the sheet 70 and allow it to drop into engagement with the tapered pins 42 passing along the support surface 18.

Returning to FIG. 1, it can be seen that the laminator apparatus 10 further includes a plurality of rollers 90, which are suspended from a transverse rod 92 and attached by flanges 94 to the laminator frame 12. The function of the rollers 90 is to force the sheet 70 firmly onto the tapered pins 42 to accurately position the sheet thereon.

A plurality of glue applicators 96 are supported above the support surface 18 on a transverse rod 98 which is fixed to the frame 12 by means of flanges 100. It is the function of these glue applicators 96 to supply adhesive onto the supper surface of the sheet 70 prior to its passing into range of a second magazine for lamination with a second sheet. A limit switch 102 is positioned to be actuated when the first sheet 70 has been completely fed onto the rails 84 and 86 by means of the rotating feed roll 54. This limit switch shuts off the motor 60 to prevent the possibility of a second sheet being fed onto the rails 84 and 86.

A first photoelectric sensor 104 is provided to position a beam of light across the support surface 18 just prior to the front rail 84. This first photoelectric sensor 104 is positioned so that its beam is broken by the passing of a pair of conveyor pins. When the beam is broken, cylinder 88 pivots front rail 84 to drop the sheet 70 onto the support surface 18 so that the holes 71 are telescopingly received on the conveyor pins 42.

The number of magazines required is entirely dependent upon the number of sheets that are to be laminated together. Thus, any number of magazines 50 may be positioned along the laminator 10 with a corresponding pair of press rolls 90 and the glue applicators 96 positioned adjacent to each magazine on the laminator 10. For the purpose of simplification here, we have not repeated the details of another magazine 50 and the pertinent equipment. Rather, we have indicated the presence of a second magazine 50a shown in dot dash lines. It should be understood that this second magazine 50a will be identical in structural detail to the magazine 50 and will require the presence of a pair of press rolls and a photoelectric sensor on the laminator 10 as did magazine 50. Identical to the operation of the first magazine 50, the second magazine 50a will feed a second sheet 70a onto a pair of rails 84a and 86a and will drop the second sheet 70a onto the pins 42 and the first sheet 70 when actuated by a photoelectric sensor 104a. It should be understood that further magazines will operate identical to the magazines 50 and 50a thus far described.

In addition, another photoelectric sensor 106 is provided adjacent to the rail 86a of each magazine subsequent to the first magazine 50. These photo cells act as a safety check to be sure that the second sheet has formed correctly onto the first sheet and stop the motor 32 if the positioning is incorrect. It is imperative to the operation of the belt section (to be described later) and the machine efficiently that the first sheet, with adhesive applied to its upper surface, does not enter the press section without the second sheet properly positioned thereon.

The laminating apparatus 10 further includes a press section indicated generally by the numeral 108. The press section 108 comprises a plurality of belts 110 each of which are rotated around a pair of rolls 112 located at each end of the belts 110. The rolls 112 are mounted on a pair of shafts 114 and are driven by motor 32 through belt 116 and pulleys 118 and 120. It is the function of these rotating belts 110 in the press section 108 to apply sufficient pressure to the stacked assembly of laminated sheets to press the assembly together and facilitate bonding. As can be seen in FIG. 1, the combination of the rotating belts 110 and the support surface 18 therebeneath forms a sandwich to facilitate the pressing of the stacking assembly of laminated sheets as it is conveyed therebetween on the conveyor pin 42.

The operation of this unique laminating apparatus is completely automatic and relatively simple. Motor 32 drives the rotating belts 110 in the press section 108 and also drives the chains 30 and the plurality of pairs of pins 42 thereby forming a conveyor moving lengthwise of the laminator frame 12. In each of the magazines 50, the motor 60 rotates feed roll 54 to propel a blank 70 and 70a onto rails 84 and 86. The motor 60 is shut off by a limit switch 102 when the sheet 70 reaches the end of rails 84 and 86. The sheet 70 is dropped onto the pins 42 when the cylinder 88 rotates the rail 84 upon actuation by the photoelectric sensor 74 which has sensed the presence of the pins 42. The sheet 70 positioned on pins 42 is conveyed under press rolls 90 which firmly position the sheet 70 onto the pins 42. Next, the sheet 70 is passed under the glue applicators 96 where an adhesive is sprayed onto the upper surface of the sheet 70. When the pins 42 break the beam of the photoelectric sensor 104a, the second sheet 70a is dropped into the engagement with the first sheet 70 on the pins 42. This procedure is repeated for each magazine present until the desired number of sheets have been combined. The resulting stack of laminating sheets is then moved on the conveyor pins 42 between the rotating belts 110 and the support surface 18 throughout the press section 108. The desired finished product, a perfectly aligned and registered stack of laminated sheets, emerges from the press section 108 in a completely bonded condition.

Hence, it should be clear that the unique apparatus of this invention through its incorporation of a tapered pin-carrying conveyor system provides a completely new approach to the problem of laminating a plurality of sheets in a completely aligned manner. The use of the tapered pins as a sheet receiving and conveying means in the unique laminator of this invention insures the proper registration and alignment of the individual sheets as they are laminated together.

Thus, the unique laminator of this invention automatically feeds, applies adhesive, and laminates together a plurality of sheets in exact registration. This machine is capable of forming a minimum of 800 stacked laminations per hour. It is estimated that this minimum speed is approximately four times the speed of a manual laminating operation.

We claim:

1. Apparatus for precisely aligning and laminating a plurality of individual sheets having alignment apertures formed therein into a multilayer pad comprising, support means having an upper surface for receiving sheets to be laminated, said upper surface having laterally spaced, longitudinally extending slots formed therein;

conveyor means carried by said support means;

drive means mounted on said support means for continuously driving said conveyor means;

a plurality of linearly spaced alignment pins mounted on said conveyor means and extending upwardly through said slots and above said support surface;

a first sheet supporting and releasing means positioned over said support surface for supporting and releasing a plurality of first sheets one at a time;

a first sheet-feeding means positioned adjacent to said first sheet supporting and releasing means for supplying individual first sheets to said first sheet supporting and releasing means in sequence;

a second sheet supporting and releasing means positioned over said support means at a laterally displaced position relative to said first sheet supporting and releasing means for supporting and releasing a plurality of second sheets one at a time;

a second sheet-feeding means positioned adjacent to said second sheet supporting and releasing means for supplying individual second sheets to said second sheet supporting and releasing means in sequence;

adhesive applicator means positioned over said support means intermediate said first and second sheet supporting and releasing means for applying adhesive to the upper surface of said first sheet as it is moved thereunder;

alignment pin position-sensing means connected to said first and second sheet supporting and releasing means for actuating same to release a sheet so that said alignment pins engage the alignment apertures in said sheet and continuously convey the sheet along the support surface;

and pressure applying means positioned over said support means downstream of said second sheet supporting and releasing means for compressing the precisely aligned first and second sheets against said support surface as the first and second sheets are conveyed under said pressure applying means by said alignment pins.

2. Apparatus as set forth in claim 1 wherein said alignment pins are substantially cylindrical and tapered on their rearward side so that the circumference of the pins decreases with distance from the drive means on which said pins are mounted.

3. Apparatus as set forth in claim 2 wherein said taper on said alignment pins is approximately 30° with the vertical.

4. Apparatus as set forth in claim 1 wherein said conveyor means includes a chain conveyor.

* * * * *